Patented Nov. 11, 1941

2,262,723

UNITED STATES PATENT OFFICE 2,262,723

GUANIDINE PERSULPHATE

Garnet Philip Ham, Old Greenwich, Conn., assignor to American Cyanamid Company, New York, N. Y., a corporation of Maine No Drawing. Application February 8, 1941, Serial No. 378,103

2 Claims. (Cl. 260—564)

This invention relates to the new compound, guanidine persulphate, and to methods of preparing it.

I have found that guanidine persulphate can be prepared by adding guanidine carbonate to a solution of ammonium persulphate in water when the reaction is carried out under the proper conditions. Carbon dioxide and ammonia are evolved during the reaction, and when the gas evolution diminishes the resulting solution is evaporated at room temperature.

Guanidine persulphate has the empirical formula $(CH_6N_3)_2S_2O_8$ and is a white, crystalline compound that is extremely deliquescent. It should be maintained in a dried condition, as in the presence of air containing normal amounts of moisture it usually becomes a liquid. A microscopical examination of the salt indicates the following phases:

(1) Anisotropic; uniaxial (+); $n_1$, slightly >1.4958; $n_2$, slightly <1.5323.

(2) Anisotropic; uniaxial; $n_1$, slightly >1.4958; $n_2$, slightly <1.555.

(3) Isotropic; $n$ >1.4089 <1.4260.

In addition to a number of other potential uses resulting from the presence of the persulphate radical, guanidine persulphate is especially well adapted for use as a photographic chemical. It operates as a selective reducer of exposed silver halide films to alter the contrast by a selective reduction of the heavier parts of the film.

The following specific example illustrates in detail the method whereby guanidine persulphate is prepared.

Example 18 g. (0.1 mole) of recrystallized guanidine carbonate was added to a solution containing 24 g. (0.1 mole) of ammonium persulphate (95%) in 50 ml. of water at room temperature. Carbon dioxide was evolved during the first part of this addition and upon continued stirring ammonia was also evolved. When the reaction was complete the solution was evaporated at room temperature under reduced pressure and the last steps of the dehydration were carried out in a vacuum desiccator over phosphorus pentoxide. 30 g. of material were obtained.

Chemical analysis indicates that about 35% of the guanidine persulphate decomposes to guanidine sulphate, but practically all of the nitrogen present is in the form of guanidine. For use as a photographic chemical this mixture can be used as well as the pure crystals themselves, as guanidine sulphate is known to be a stabilizer for photographic fixers.

What I claim is:

1. Guanidine persulphate.

2. A method of preparing guanidine persulphate which comprises the steps of reacting guanidine carbonate with an aqueous solution of ammonium persulphate and evaporating the solution.

GARNET PHILIP HAM.